(No Model.) 5 Sheets—Sheet 1.

F. W. TAYLOR.
TOOL FEEDING MECHANISM FOR LATHES.

No. 417,527. Patented Dec. 17, 1889.

FIG. I.

(No Model.)  5 Sheets—Sheet 2.

F. W. TAYLOR.
TOOL FEEDING MECHANISM FOR LATHES.

No. 417,527. Patented Dec. 17, 1889.

WITNESSES:
C. M. Clarke
F. E. Gaither

INVENTOR
Fred. W. Taylor
BY
Snowden Bell,
ATTORNEY (No Model.)  5 Sheets—Sheet 3.
F. W. TAYLOR.
TOOL FEEDING MECHANISM FOR LATHES.
No. 417,527.  Patented Dec. 17, 1889.

WITNESSES
E. Cruse
J. Henry Kaiser

INVENTOR
Fred W. Taylor
by Thordew Bell
Attorney (No Model.) 5 Sheets—Sheet 4.

F. W. TAYLOR.
TOOL FEEDING MECHANISM FOR LATHES.

No. 417,527. Patented Dec. 17, 1889.

WITNESSES
E. Layne.
J. Henry Kaiser.

INVENTOR
Fred. W. Taylor
by J. Snowden Bell,
Attorney

(No Model.) 5 Sheets—Sheet 5.

F. W. TAYLOR.
TOOL FEEDING MECHANISM FOR LATHES.

No. 417,527. Patented Dec. 17, 1889.

WITNESSES:

INVENTOR,
Fred. W. Taylor,
by Snowden Bell
Att'y.

UNITED STATES PATENT OFFICE.

FREDERICK W. TAYLOR, OF PHILADELPHIA, PENNSYLVANIA.

TOOL-FEEDING MECHANISM FOR LATHES.

SPECIFICATION forming part of Letters Patent No. 417,527, dated December 17, 1889.

Application filed July 30, 1888. Serial No. 281,401. (No model.)

*To all whom it may concern:*

Be it known that I, FREDERICK W. TAYLOR, of the city and county of Philadelphia, in the State of Pennsylvania, have invented a certain new and useful Improvement in Feed Mechanisms for the Cutting-Tools of Lathes, Boring-Machines, and other Machine-Tools, of which improvement the following is a specification.

My invention relates to mechanisms employed in machine-tools—such as lathes, boring-mills, &c.—which are used for altering the form and dimensions of pieces of metal, wood, stone, and other materials, commonly called "work," to advance the cutting-tool into the work while a portion of the material composing the work is being removed therefrom by the tool.

In general, the defects in feed mechanisms heretofore employed may be stated, briefly, to be due to the following causes: first, the elasticity of the parts supporting the tool—such as the tool-slide, saddle, carriage, &c.; second, the lost motion or play in the joints of the parts supporting the tool; third, the elasticity, deflection, and lost motion in the parts affecting and controlling the "feed-motions" of the tool and its support, as the feed-screw, its nut and bearing, and those of the hand-crank or the automatic operating-connection of the tool-slide of an ordinary engine-lathe; fourth, the tendency of the pressure of the parts affecting feed-motion to push the parts supporting the tool in one direction, while the pressure of the work upon the tool tends to force these parts in the opposite direction, and, fifth, the fact that the pressure exerted upon feed mechanisms as heretofore constructed in order to operate them has been a variable one, its amount being dependent upon the pressure between the tool and the work.

My invention is designed to obviate the objections above indicated as obtaining in feed mechanisms as heretofore constructed; and its object, chiefly and generally, is to effect the production of an initial deflection in the part or parts and a taking up of lost motion from the joints of the mechanism constituting the tool-support prior to the entrance of the tool into the body of the work, to produce this deflection substantially in the same direction, as the resistance of the work upon the tool when taking the cut would otherwise and subsequently deflect and move the supporting parts; and as the tool enters the work and in the resistance to which the entrance subjects the tool, to compensate for certain of the forces by which deflection was initially effected. The designed result of mechanism so operating is that from the moment of contact between the tool and the work to the limit of the range through which the tool is fed there shall be but little, if any, disturbance of the artificially pre-established deflection and take-up.

The objects of my invention, stated more specifically and in detail, are, first, to provide an improved feed mechanism for the cutting-tool of a machine which shall be free from lost motion, and to thereby prevent the chatter and irregular feeding due to such cause; second, to provide an improved feed mechanism for the cutting-tool of a machine which shall cause the tool-support to which it is applied to deflect before the tool has come in contact with the work to approximately the same extent and in the same direction (as far as it is practicable to accomplish this end with one feed mechanism) as it (the tool-support) would deflect after the tool is operating upon the work; third, to provide an improved feed mechanism for the cutting-tool of a machine which shall cause the lost motion between the joint of the tool-support to which it is attached and the part upon which this tool-support moves to be taken up before the tool has come in contact with the work to approximately the same extent and in the same direction (as far as it is practicable to accomplish this end with the use of one feed mechanism) as the lost motion would cause the tool-support to vibrate or chatter after the tool is operating upon the work; fourth, to provide an improved feed mechanism for the cutting-tool of a machine which shall cause not only the tool-support or part to which it is applied, but also one or more other tool supports or parts which are mounted upon it, or upon which it is mounted, to deflect before the tool has come in contact with the work to approximately the same extent and in the same direction (as far as it is practicable to accomplish this end with the use of one feed mechanism) as they (the tool-supports) would deflect after the tool is operating upon the work; fifth, to provide an improved feed mechanism for the cutting-tool of a machine which shall cause the lost motion in the joint of the tool-support upon which it operates, as well as the lost motion in the joints of other tool-supports upon which it is mounted, or which are mounted upon it, to be taken up before the tool has come in contact with the work to approximately the same extent and in the same direction (as far as it is practicable to accomplish this end with the use of one feed mechanism) as the lost motion would cause these tool-supports to vibrate or chatter after the tool is operating upon the work; sixth, to provide two or more feed mechanisms for the cutting-tool of a machine which, acting at the same time upon two or more of the parts which support the tool, shall cause not only the tool supports or parts to which the feed mechanisms are directly applied, but also other tool supports or parts mounted upon them, or upon which they are mounted, to deflect before the tool has come in contact with the work to approximately the same extent and in the same direction as they would deflect after the tool is operating upon the work; seventh, to provide two or more feed mechanisms for the cutting-tool of a machine which, acting at the same time upon two or more of the parts which support the tool, shall cause not only the lost motion of the joints of the tool-supports to which the feed mechanisms are directly applied, but also the lost motion in the joints of the other tool supports, or parts mounted upon them, or upon which they are mounted, to be taken up before the tool has come in contact with the work to approximately the same extent and in the same direction as the lost motion would cause these parts to vibrate or chatter after the tool is operating upon the work; eighth, to provide an improved feed mechanism (whether it be an automatic or a hand feed) in which the power required to operate it shall be the same, whether the feed be coarse or fine, and in which the power required to operate the feed shall decrease with the increase of the pressure of the work on the tool; ninth, to provide an improved feed mechanism in which the power required to operate the portion of the feed mechanism which regulates the rate of the feed, whether the rate of the feed be regulated by hand or automatically, shall be a fraction only of the power required to feed the tool, and, tenth, to provide an improved feed mechanism for the cutting-tool of a machine in which the friction of the various elements which constitute the train of mechanism used for feeding shall exert an advantageous instead of a disadvantageous action, in permitting the members of the train of feed mechanism to be made relatively lighter than those of the ordinary feed-motions the further they are located from the cutting-tool.

My invention embodies as its leading characteristic features two essential elements, which together constitute the feed mechanisms, and which, generally stated, are as follows: The first, which I term an "advancing mechanism," has for its function to maintain throughout the period of operation of the feed mechanism a continuous and approximately uniform pressure upon the slide or part to which the feed mechanism is applied, such pressure tending to cause the tool to advance in the direction in which it is desired that it should feed. This advancing mechanism consists of a ram, preferably such as the plunger or piston of a cylinder containing water, steam, or other gas or fluid under controllable pressure, which ram transmits such pressure, either directly or indirectly, through a train of gearing or lever or series of levers or other suitable means of transmitting pressure, to the slide or part supporting the tool which it is desired to advance.

In lieu of a pressure-actuated ram, as above specified, any of the well-known mechanisms for producing a substantially-constant thrust upon and between a movable member and a relatively-fixed abutment may be substituted as mechanical equivalents.

The second element of my invention, which I term a "rate-governing mechanism," and whose leading features are a holdback screw and nut, is provided to perform the function of regulating the rate at which the tool is allowed to advance or feed into the work. The strain of the rate-governing mechanism may be said to be, in general, in the opposite direction from that of the advancing mechanism. The rate-governing mechanism may consist either of a train of gears or gearing, in combination with a screw, and is susceptible of an infinite variety of forms. It may be similar in all respects to ordinary feed motions as heretofore used, except that, instead of being used to advance the tool by exerting a pressure upon one of the slides supporting it, the rate-governing mechanism acts in the manner of an escapement, regulating the rate at which the advancing mechanism, which acts in conjunction with it, feeds the tool. If the feed mechanism is to be automatic, the rate of feed would be governed by the relative proportions of the gearing or screws, &c., of which the rate-governing mechanism was composed. If it were to be fed by hand, the rate of the feed would be at the discretion of the operator.

A special and marked difference is, however, to be noted between the ordinary feed mechanism and the rate-governing mechanism which forms one of the elements of my invention—to wit, that, owing to the friction of the parts of the ordinary feed mechanism, only a small fraction of the power which is used to drive the feed mechanism is transmitted to the slide or tool-support which it is desired to advance, the greater part of the power being ordinarily absorbed in the friction of the parts of the feed mechanism, while in the case of the rate-governing mechanism the friction of the parts acts usefully and effectively, instead of being a disadvantage, for the reason that it diminishes the stress that would otherwise be induced upon the parts of the rate-governing mechanism, which are more remote from the slide upon which it is operating, thus allowing them to be much lighter and less cumbersome than those of the ordinary feed motion.

My invention, in general terms, consists, first, in the combination of an advancing mechanism and a rate-governing mechanism, which operate conjointly and simultaneously upon the same slide or other part supporting the tool, the function of the advancing mechanism being to exert a continuous and approximately uniform pressure upon the slide in the direction in which it is desired that it should be fed, and that of the rate-governing mechanism being either to entirely prevent the advance of the slide by exerting an equal pressure in the opposite direction upon the slide or to regulate the rate at which the advancing mechanism shall cause the slide supporting the tool to feed. The resultant effect of this combination of an advancing and rate-governing mechanism is to take up entirely all lost motion in the feed-motion before the tool comes in contact with the work, and to cause all of the parts of the feed-motion to be sprung or deflected to their maximum extent before the tool comes in contact with the work, thus avoiding chatter and irregularity in the finish of the work and in the operation of feeding the tool due to these causes.

It consists, second, in so disposing the advancing mechanism and the rate-governing mechanism with relation to the tool-support, which they are intended to feed, that the combined pressure of the two mechanisms shall tend to cause the tool-support to deflect or spring (as far as is practicable with the use of one feed mechanism) in the same direction and to approximately the same extent as the pressure of the work on the tool would cause it to deflect.

It consists, third, in so disposing the advancing mechanism and the rate governing mechanism with relation to one another and to the tool-support, which they are intended to feed, that the combined pressure of the two mechanisms shall tend to cause the lost motion of the joint of the tool-support, with the part supporting it, to be taken up to approximately the same extent and in the same direction (as far as is practicable with the use of one feed mechanism) as the pressure of the work upon the tool would cause this lost motion to be taken up.

It consists, fourth, where two or more slides or parts, one mounted on the other, are used in supporting the tool, in arranging the advancing mechanism to operate upon one of these slides or parts, while the rate-governing mechanism is attached to and operates on another of the slides or parts, in such manner that the combined strain of the advancing and rate-governing mechanisms causes not only the tool-support, which the two parts or elements of the feed mechanism are intended to feed, but also one or more of the slides or parts mounted on this tool-support, to deflect to approximately the same extent and in the same direction (as far as is practicable with the use of one feed mechanism) as the pressure of the work upon the tool would cause them to deflect.

It consists, fifth, where two or more slides or parts, one mounted on the other, are used in supporting the tool, in arranging the advancing mechanism to operate on one of these tool-supports, while the rate-governing mechanism is attached to or operates on another of the tool-supports, in such manner that the combined strain of the advancing and rate-governing mechanisms causes the lost motion to be taken up, not only of the joints of the tool-support, which the feed mechanism is designed to feed, but also the lost motion in the joints of the other slides or parts for supporting the tool to be taken up to approximately the same extent and in the same direction (as far as is practicable with the use of one feed mechanism) as the pressure of the work upon the tool would cause this lost motion to be taken up.

In many cases the pressure of the work on the tool is in such a direction that a single feed mechanism acting on a tool-support cannot be so applied as to cause the tool-support to deflect in the same direction that the pressure of the tool would cause it to deflect. Further, although one feed mechanism can be applied to a tool-support in such manner as to take up the lost motion, not only of the tool-support to which it is applied, but also of the other slides or parts mounted upon it, in one direction, yet the pressure of the feed mechanism upon the tool-supports (tending to take up the lost motion in them) is not always in the same direction as is that of the work upon the tool, so that one feed mechanism can only take up part of the detrimental lost motion in the tool-supports. It therefore in many cases becomes necessary to have two feed mechanisms acting conjointly upon the supports of a tool at the same time, the function of one of the feed mechanisms being merely to put the tool-supports under such a strain as to cause them to deflect in the desired direction, and also to take up the lost motion of the tool-support in that direction, while the function of the second feed mechanism is not only to cause the tool-supports to deflect in another direction and the lost motion to be taken up in that direction, but also at the same time to feed the tool in the direction desired. In this case one of the feed mechanisms merely puts the tool-supports under strain, but does not cause any of them to advance, while the other of the feed mechanisms not only puts the tool-supports under strain in a different direction from the first, but also causes one of them to advance, and so effects the feed of the tool.

The considerations above stated relate to the next feature of my improvement, consisting, sixth, where two or more slides or parts mounted one upon the other are used for supporting a cutting-tool, in providing two at least of the tool-supports with suitable advancing mechanisms which shall bring sufficient pressure upon the supports to which they are applied to cause them to feed in the desired direction against the resistance of the tool. Each of the advancing mechanisms should be provided with a rate-governing mechanism, which will regulate the rate at which its advancing mechanism shall feed the tool, and one at least of the two rate-governing mechanisms should be attached to and pull or push against a different slide or part from the one upon which its advancing mechanism operates. Each advancing mechanism, with its accompanying rate-governing mechanism, should be so applied to the part supporting the tool that their combined strain will cause the lost motion to be taken up in the joints of the tool-supports, and will cause the parts supporting the tool to deflect to as great or to a greater extent, if practicable, than the pressure of the tool would cause them to deflect. By the proper application of two advancing and two rate-governing mechanisms, as above referred to, at the same time to the slides or parts supporting the tool all of the deflection and lost motion of the parts supporting the tool may be taken up before the tool comes in contact with the work.

It consists, seventh, in providing as one of the elements of the train of mechanism used as a rate-governing mechanism a screw which I designate as a "releasing-screw." This screw can be proportioned in either of two ways, first, the angular pitch of the thread of the screw should be so steep and the collar or bearing that receives the end-thrust of the screw should be so proportioned that if the screw be started to rotate a pressure exerted upon the nut which fits on the releasing-screw in the direction of the axis of the screw should almost but not quite cause it to continue to rotate; or, second, the angular pitch of the thread of the screw should be so steep and the collars or bearing that receives the end-thrust of the screw should be so proportioned that if a pressure be exerted upon the nut which fits on the releasing-screw in the direction of the axis of the screw it should just cause the screw to start to rotate even when it is stationary or in a condition of rest. A screw proportioned so as to fill either of the above conditions and used as one of the elements of a rate-governing mechanism I shall call a "releasing-screw." As an equivalent for this releasing-screw, there may be substituted a worm of a steep angular pitch or a spiral pinion of a steep angular pitch working into a corresponding worm-wheel or rack.

It consists, eighth, in providing a feed mechanism for the cutting-tool of a machine in which the power required to operate the train of mechanism used for regulating the rate of feed grows less and less, step by step, proportionately to the distance from the cutting-tool.

In the accompanying drawings.

Figure 1:
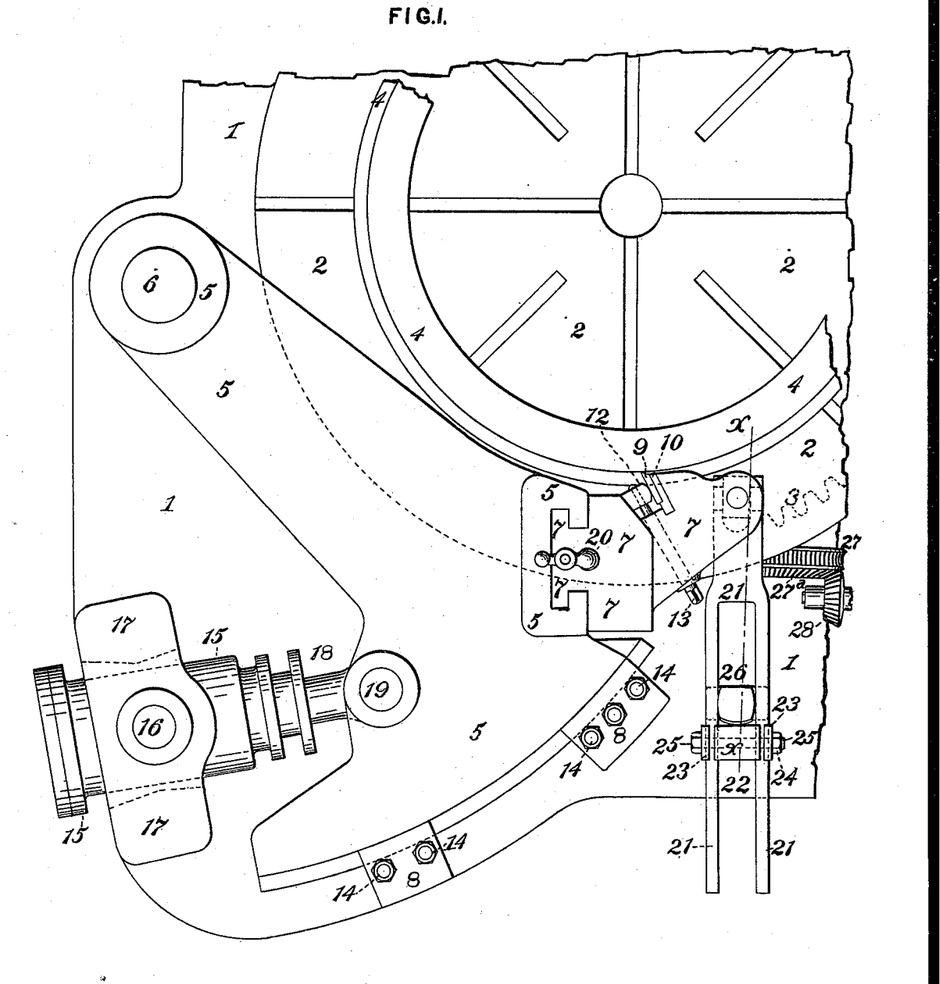
Figure 1 is a plan or top view of a special horizontal boring-mill designed for turning tires of locomotive or car wheels and provided with a feed mechanism embodying my invention.
Figure 2:
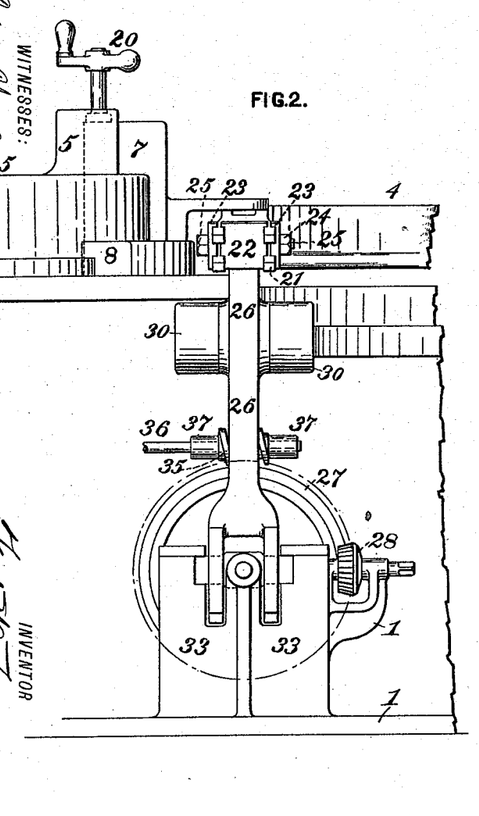
Fig. 2, an end view.
Figure 3:
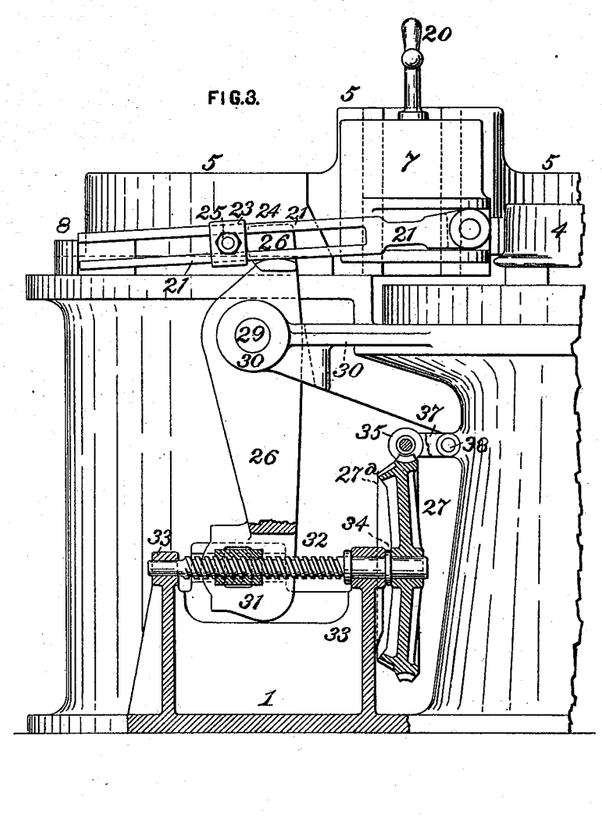
Fig. 3, a side view, a portion of the feed mechanism being shown in section at the line $x\ x$ of Fig. 1.
Figure 4:
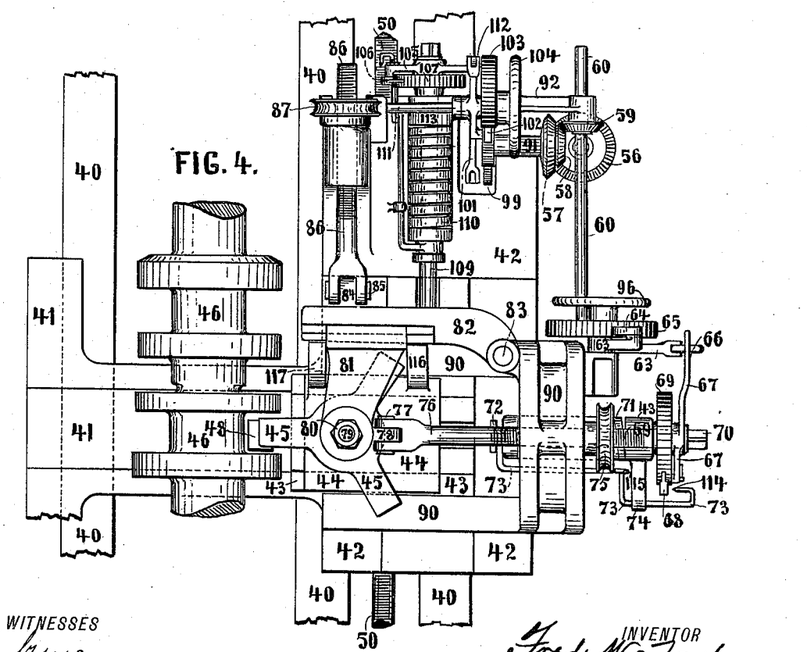
Fig. 4, a plan or top view of a portion of a lathe embodying my invention.
Figure 5:
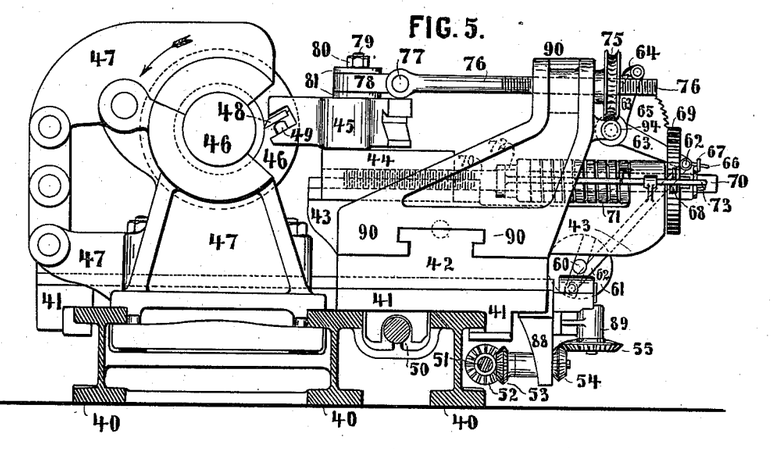
Fig. 5, an end view of the same with the bed in section.
Figure 6:
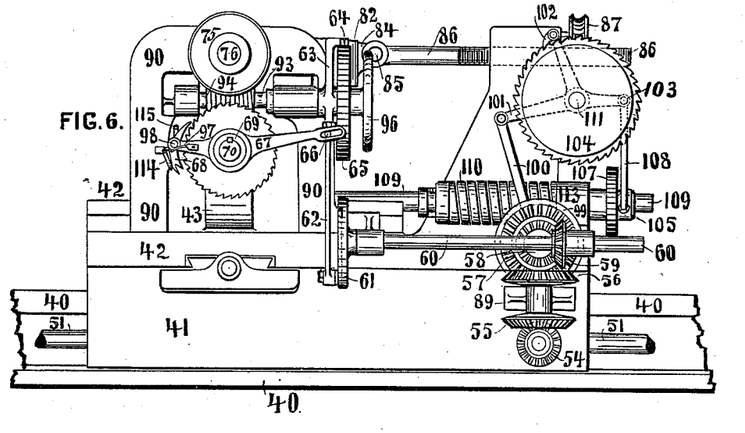
Fig. 6, a side view, in elevation, of a portion of the same.

Referring to Figs. 1 to 3, inclusive, the operative mechanism of the boring-mill to which my invention is therein shown as applied is mounted and supported upon a main frame or body 1, upon which a table or face-plate 2 is fitted to be driven or caused to rotate by any suitable driving mechanism. Fig. 1 shows in dotted lines the teeth of a gear attached to the outside of the table and serving to drive the same. A tire 4 is shown as attached to the table 2, so as to be rigidly supported thereon in position for turning off its tread by a cutting-tool 9. The cutting-tool in this case consists of a broad cutter which extends the full width of the part of the tire which it is desired to turn. This cutter is pressed, by means of a wedge 12, which is drawn tight by a screw 13, against a shoe 10, which is supported by the vertical tool-slide 7. This vertical slide is supported and guided by a swinging slide 5, which is supported and guided at its outer end and upon the main body 1 of the machine, and is held down thereon by the clamps 8 and the bolts 14. The entire slide 5 pivots or swings about the post 6, around which it fits and by which it is supported, the post 6 being either integral with or attached to the main frame or bed of the machine.

In the feed mechanism which is used to feed the tool against the tire the advancing mechanism consists of a cylinder 15, which is adapted to be supplied with water or steam or other liquid or gas under pressure. The cylinder 15 is mounted upon trunnions, the upper one of which 16 is shown in the drawings. These trunnions are supported by and abut against the elevated portions 17 of the main frame. Proper pipes and valves for supplying the cylinder with the liquid or gas under pressure are arranged so as to enable the pressure of the liquid or gas to be exerted in forcing the piston toward either end of the cylinder at the will of the operator of the machine. The cylinder 15 is fitted with a suitable piston secured upon a piston-rod 18, the outer end of which is coupled by a pair of trunnions 19 to the swinging slide 5.

The rate-governing mechanism is of the following construction: A connecting link, casting, or forging 21 is connected at one end by a swinging joint to the vertical slide 7 at a greater distance from the guiding-surface of the vertical slide, which fits in the swinging slide 5, than the distance of the tool from said guiding-surface. The connecting link, casting, or forging 21 is provided with a movable stop-block 22, which can be moved into different positions along the connecting-link and clamped fast thereto in any desired position by means of a bolt 25 and nut 24 and the two washers 23. This stop-block is shown as pressing against the upper arm of a double-armed lever 26, which pivots upon and is supported by a pin 29, fitting in a bearing 30, projecting from the main frame of the machine. The lower arm of the lever 26 carries a nut 31, having on each side a trunnion fitting in a suitable bearing in the lever, so that the nut may remain in a horizontal position as the lever moves out of a perpendicular position. The nut 31 engages a releasing-screw 32, having a thread of very rapid pitch. The screw 32 is fitted to rotate in bearings 33, fixed to the main frame, and is provided with collar 34, by which its end motion is prevented.

The angular pitch of the thread of the screw 32 should be of such steepness and the supporting-collar 34 of such dimensions that a pressure brought by the nut upon the screw will be almost sufficient to cause the screw to rotate and allow the nut to run down; or the angular pitch of the thread of the screw and the proportions of the collar 34 should be such that a pressure brought to bear by the nut upon the thread will insure under all circumstances the rotation of the screw and allow the nut to run down it; but in this case the angular pitch of the screw and the dimensions of the collar should be such that a pressure upon the nut will not cause the screw to turn with great rapidity. To illustrate the requirements more clearly, it should be stated that a certain angular pitch of a screw-thread will, in combination with a certain dimension of the thrust-collar on the screw, just insure the turning of a screw when the nut which engages it is subjected to pressure. In the application of this part of my invention the pitch of the screw-thread and the dimensions of the collar should be designed in one of two ways—to wit: either that when the pressure is brought upon the nut the screw-thread will almost but not quite turn, or that the pressure of the nut will insure the turning of the screw, while at the same time it will not force it to turn too easily. The reason for proportioning the screw and the collar thereon in either of these ways is that under either of the conditions mentioned a comparatively small amount of power will suffice when applied to the screw to affect its rotation, as the pressure of the nut upon the screw induces a strong tendency to rotation in the latter. It would not be practicable for the pitch of the screw and the design of the collar to be otherwise than in accordance with one of the two conditions above stated, as if not so it would sometimes be doubtful whether it would require a slight push to start the feed-motion to working or a pull to prevent it from working. Upon the end of the releasing-screw 32 is fixed a worm-wheel 27, on one side of which is cast a bevel-gear 27ª, meshing with a corresponding pinion 28, which may be operated by an ordinary crank-handle applied to the squared end of its shaft and not shown in the drawings. The worm-wheel 27 meshes with a worm 35, fixed upon a worm-shaft 36, which is supported by a rocker-bearing 37, pivoted to a pin 38 on the frame. The worm 35 can be thrown out of gear with the worm-wheel 27 by pivoting the rocker-bearing 37 around its pin 38. The worm-shaft 36, which is shown as broken off in the drawings, is to be connected by a suitable train of feed-gearing either to a member of the mechanism which drives the table of the machine or to any other suitable prime mover, as the case may require.

The operation of the feed mechanism is as follows: Assuming that the tool 9 has been moved to within a short distance of the piece of work 4, the upper part of the lever 26 should then be slightly farther away from the work than it now is. The stop-block 22, having been rigidly fastened to the connecting link, casting, or forging 21, is brought to a firm bearing against the upper end of the lever 26. Liquid or gas under pressure being admitted to the back end of the cylinder 15, so as to produce a pressure upon the piston tending to force it toward the front end of the cylinder, the pressure from this liquid or gas will be transmitted by the piston-rod 18 and trunnions 19 to the swinging slide 5, thus inducing a heavy pressure upon the swinging slide 5, tending to force it and the vertical slide 7, which is attached to it, toward the work 4. Since, as above explained, the connecting-link 21 is fastened at one end to the vertical slide 7 and has a bearing-block 22 attached to it and bearing against the lever 26, the slide is prevented from moving toward the work until the lower end of the lever is allowed to move by turning the feed-screw, which can be done by operating the feed-motion. It will be observed that by the combined strain of the advancing mechanism and the rate-governing mechanism, as described, both the swinging slide 5 and the vertical slide 7 are put under heavy strain, which is quite as great as, if not greater than, the pressure which the tool would induce upon them, thus causing them both to deflect in the same direction and to an extent as great as or greater than they would be caused to deflect by the pressure of the work upon the tool and taking up all of the lost motion between the joint of the vertical slide 7 and swinging slide 5, also between the slide 5 and its supporting-post 6, to the same extent as or a greater extent than the lost motion would be taken up by the pressure of the work upon the tool. While the advancing and rate-governing mechanisms and all parts of the slides 5 and 7 are under this strain, let it be assumed that the worm 35 is thrown out of gear with its worm-wheel 27. This worm-wheel can then be made to rotate by the attachment of a hand-crank to the shaft of the small bevel-wheel 28, and the rotation of the worm-wheel 27 will cause the releasing-screw 32 to rotate and allow the lower end of the lever 26 to move in such direction that the upper end of this lever will approach the work, thus allowing the tool to approach the work until it begins to cut it. Thereupon the worm can be again thrown into gear with the worm-wheel and the feed-motion from this point on be made automatic. It will be observed that by this means there is no greater tendency on the part of the tool or the slides supporting it to chatter or deflect after the tool is at work than before it begins to operate. When sufficient metal has been removed from the work, the tool can be readily withdrawn therefrom by transferring the pressure of the liquid or gas from the back to the front end of the cylinder, thus causing all of the parts of the slide to move back easily and quickly, however heavy they may be and however tightly they may be supported by the guides.

The hand-crank 20 (shown in the drawings) is fixed on the end of an ordinary feed-screw, which, engaging in a suitable nut attached to the frame 5, causes the slide 7 to be fed either up or down, as the case may require. Instead of this hand-feed one of my improved feed mechanisms may be employed. In such case the advancing mechanism should be arranged so as to abut against a suitable support attached to the swinging slide 5. The advancing mechanism should then push down the vertical slide 7 close to the bearing of this slide in the swinging slide 5, while the rate-governing mechanism should be attached so as to pull up upon the slide 7 at a part of the slide farther away from the swinging slide 5 than the advancing mechanism pushes from it. Under such construction the combined strain of the advancing and rate-governing mechanisms would cause the slide 7 to deflect upward in the same manner that the pressure of the work against the cutting-tool, arranged so as to cut beneath the slide, would cause it to deflect.

Figure 10:
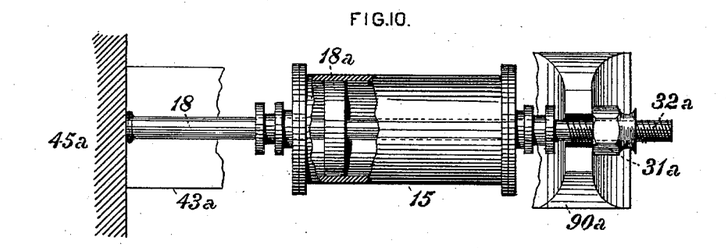
Fig. 10, a plan view, partly in section, illustrating another modification.

It is further to be noted that the rate-governing mechanism shown in the drawings need not necessarily be attached, as shown, to the vertical slide 7, as it may, if preferred, be attached to the swinging slide 5. The advancing mechanism could then occupy the same position as shown in the drawings. The combined strain of the advancing and rate-governing mechanisms would then cause the swinging slide 5 to deflect in approximately the same direction and to approximately the same extent that the pressure of the work against the cutting-tool would cause this slide to deflect. Such an arrangement of the advancing and rate-governing mechanisms would not, however, be as satisfactory nor attain the same end as the construction shown in the drawings, since the slide 7 would still deflect under the pressure of the work against the tool, and the lost motion in the joint between the slide 7 and swinging slide 5 could not be taken up. The rate-governing mechanism may also be attached directly to the piston-rod 18 of the advancing mechanism, as shown in Fig. 10, in which the hydraulic cylinder 15 is secured upon a member $90^a$ of a tool-supporting carriage which is fixed relatively to a tool-holder $45^a$, which is movable toward and from the carriage member $90^a$ upon another member $43^a$. The holdback or releasing screw $32^a$ is formed upon the end of the piston-rod 18 opposite to that which bears against the tool-support $45^a$, and its nut $31^a$ bears against the carriage member $90^a$. The abutments of the ram $18^a$ of the advancing mechanism and the releasing-screw $32^a$ of the rate-governing mechanism being, respectively, the separate members $45^a$ and $90^a$ of the tool-supporting carriage, there results in operation a take up in the mutual joints of the parts, as well as an elongation and initial deflection (due to tension on the releasing-screw $32^a$ and compression on the ram or piston $18^a$ and its rod) of at least a part of the series of tool-supporting members.

Figure 11:
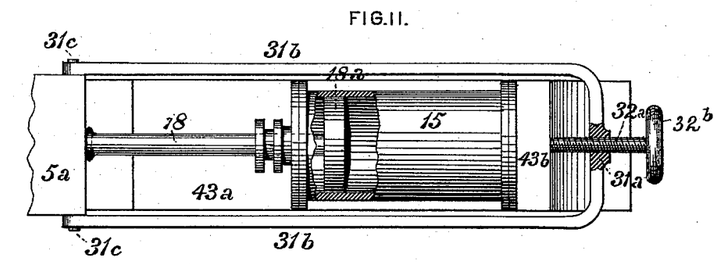
Fig. 11, a similar view illustrating a further modification.
Figure 12:
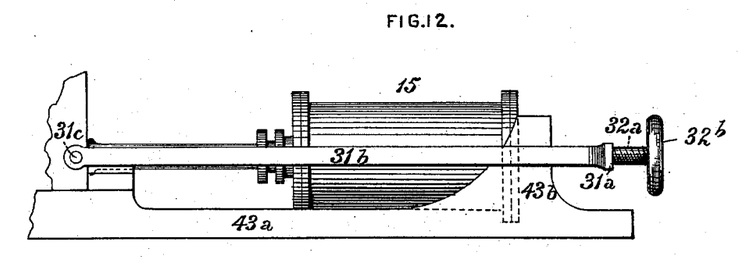
Fig. 12, a side view, in elevation, of the same.

In the further modification illustrated in Figs. 11 and 12 the hydraulic cylinder 15 is secured upon a relatively-fixed member $43^a$ of a tool-supporting carriage, upon which an ordinary tool-support $5^a$ is fitted to slide. The holdback or releasing screw $32^a$ bears against a fixed abutment $43^b$ on the carriage member $43^a$ and engages a nut $31^a$, having lateral tension-bars $31^b$, which are coupled by pins $31^c$ to the movable tool-support $5^a$, and the piston-rod 18 bears, as before, against the tool-support $5^a$. Initial deflection and strain are induced as in the instance exemplified in Fig. 10, and the release required in feeding the tool-support is afforded by the rotation of the holdback-screw by a hand-wheel $32^b$, fixed upon its end. In each of the above instances fluid under pressure is admitted to the right-hand end of the cylinder. As will be seen, the advancing and the rate-governing mechanisms would operate directly upon a single slide, and the sacrifice of advantage as compared with the constructions illustrated in the remaining figures would, generally speaking, be a certain degree of loss in the initial deflection and an absence of "take up" of lost motion from the joints, which might be attained by applying the thrust of the advancing mechanism not only out of line with but upon a different tool-supporting part from that to which the rate-governing mechanism is applied.

A practical application of my invention in feeding the cutting-tool of a large lathe provided with two feed mechanisms, each consisting of an advancing and a rate-governing mechanism, both pairs acting on the support for the same tool at the same time, is illustrated in Figs. 4 to 9, inclusive, and, referring to said figures, will now be described.

In order that the strain may be brought upon the cutting-tool in such manner as to render the application of the feed-motion simple and effective, the lathe is run in the opposite direction to that in which lathes are ordinarily run, so that the pressure of the work upon the cutting-tool tends to cause the tool to deflect upward and outward, instead of downward and outward, as is usually the case. Upon the shears or bed 40 of the lathes are mounted two housings 47, adapted to receive the neck of a roll 46, which is the work upon which in this case the lathe is shown as operating. The work is rotated in the direction indicated by the arrow in the drawings in the manner in which rolls are ordinarily driven when in a lathe; but the direction in which the roll is rotated is, however, the opposite to that in which rolls are usually rotated when in a lathe. A saddle 41 is mounted upon the lathe-bed and is adapted to be moved along the shears of the lathe by means of a leading-screw 50, which is similar to leading-screws generally employed for this purpose. To the top of the saddle 41 is bolted a heavy casting 42, on the upper part of which is shown a raised portion which is provided with a flange on either side for receiving and supporting a tool-support, this portion being planed true and parallel in all parts to the center line or axis of the work 46. Upon this casting 42, and fitting closely around and underneath the elevated flanges thereof, is mounted a tool-support 43, which is guided as it is moved in a direction parallel to the center line of the work by the raised and flanged portion of the casting 42, above referred to. The upper portion of the tool-support 43 is provided with flanges similar to those used on the elevated portion of the part 42, but which are, however, planed so as to be at right angles to the center line of the work.

Upon the tool-support 43 is mounted another tool-support 44, the lower portion of which is planed so as to fit underneath the flanges planed on the upper surface of the tool-support 43. The tool-support 44 is adapted to slide freely on these flanges as guides, so as to either approach or recede from the center line of the work, as required. Upon the tool-support 44 is mounted a tool-holder 45, which is adapted to be turned upon the axis of a stud-bolt 79, by which it is secured to the tool-support 44. A tool 48 is firmly wedged into place in one of the three tool-holding receptacles of the tool-holder 45 by means of a wedge 49.

A brace 90, which is a casting consisting of two heavy legs joined together at the top, has its bottom surface planed so as to fit around the elevated and flanged portion of the casting 42, one of the legs of the brace 90 being on each side of the tool-support 43, so that whenever the latter is slid either backward or forward along the upper surface of the casting 42 the brace 90 participates in its movement.

A cylindrical shaft 51 (shown in section in Fig. 5 and side elevation in Fig. 6) is driven by gearing connected with the live-spindle of the lathe. A longitudinal keyway is cut in the shaft 51, in which fits a key fixed to a bevel-gear 52, so that the gear 52, while rotating with the shaft 51, is free to move endwise thereon in correspondence with the backward and forward movements of the saddle 41 of the lath. A bevel-gear 53, meshing with the gear 52, is mounted on a short shaft having its bearing in a bracket 88, which is attached to the saddle 41. On the other end of this shaft is fixed a bevel-gear 54, which drives a larger bevel-gear 55, secured upon the lower end of a vertical shaft which is supported in a bracket 89, attached to the lathe-saddle 41. A bevel-gear 56 is fixed upon the upper end of the shaft of the bevel-gear 55, the bevel-gear 56 driving a bevel-gear 57, mounted on a shaft which is supported by a bracket 91, attached to lathe-saddle 41. A bevel-gear 58, fixed upon the end of the shaft of the bevel-gear 57, drives a bevel-gear 59, which is mounted on a shaft 60, the shaft 60 being splined longitudinally to receive a key fixed to the gear 59, so that although the shaft 60 is rotated by the bevel-gear 59 it is free to slide endwise backward and forward through said bevel-gear as the tool-support 43 is slid backward or forward on the part 42. One end of the shaft 60 is guided and supported by a bracket 92, which is attached to the lathe-saddle 41, while the other end of this shaft is supported by a bracket attached to the tool-support 43.

On the end of the shaft 60, adjacent to the bearing in which it is supported on the tool-support 43, is fixed a crank-disk 61, which is provided with a slot in its face, into which a crank-pin is fitted in such manner that it can be slid either toward or from the center of the disk and clamped fast in any desired position, so that when the crank-disk 61 is caused to rotate by the shaft 60 the crank-pin revolves with the disk in a circle of greater or less diameter in accordance with its adjustment. This crank-pin is coupled by a connecting-rod 62 to a bell-crank 63, journaled on the brace 90, and as the crank-pin revolves with the disk 61 the bell-crank 63 is thereby oscillated about the axis of the shaft upon which it is mounted. It will be seen that the bell-crank 63 oscillates through a larger or a smaller angle, according as the crank-pin is farther from or nearer to the center of the crank-disk 61. To the upper arm of the bell-crank 63 is pivoted a pawl 64, which overhangs a ratchet-wheel 65. As the bell-crank 63 oscillates backward and forward, the pawl 64 engages the teeth of the ratchet-wheel 65 and causes it to rotate intermittently through a certain arc, the range of motion of the ratchet-wheel depending upon the degree of the angle of oscillation of the bell-crank, it being possible to adjust the crank-pin in the crank-disk 61 so that each revolution of the crank shall cause the ratchet-wheel 65 to rotate through the space occupied by one or more of the teeth on its circumference, as the case may require. The ratchet-wheel 65 is keyed fast on the shaft 93, upon which a worm 94 is also secured. This worm engages a worm-wheel 75, upon the inside of which is cut an internal thread which engages a screw 76, so that when the worm-wheel 75 is rotated the screw 76 is caused to move in one or the other direction, as the case may require. The worm-wheel 75 abuts against and is supported by the brace 90 through an opening in which the screw 76 passes freely. The other end of the screw 76 is coupled to a ring 78 by means of a pin 77, which passes through a hole bored through two forks in the end of the screw 76 and through a projection on the ring 78. The ring 78 is bored to fit freely around the stud-bolt 79, thus allowing the tool-holder 45 to be pivoted around the same on the top of the tool support 44.

Figure 7:
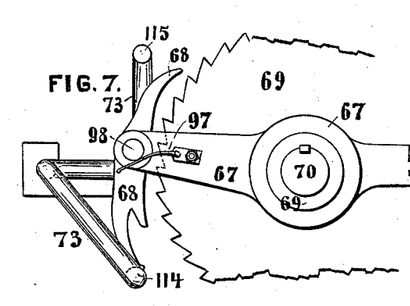
Fig. 7, a view in elevation and on an enlarged scale, showing details of the feed mechanism.

A projecting pin 66 is fixed on the end of one of the arms of the bell-crank 63, around which pin is fitted the end of a rocker-arm 67, the hole through which the pin 66 passes being slotted, so as to allow the rocker-arm 67 to oscillate about the shaft 70, such movement of the rocker-arm being effected by the oscillation of the arm of the bell-crank 63. On the other end of the rocker-arm 67 is journaled a pawl 68, which is so attached to the rocker-arm 67 that it can be either thrown in and made to engage the ratchet-wheel 69, or held out of gear from the ratchet-wheel 69, by means of a spring 97, which is shown in Fig. 7. The ratchet-wheel 69 fits on and is connected by a key with the shaft 70, this shaft being splined for about one-third of its length, so as to permit of end motion of the shaft backward or forward through the ratchet-wheel 69. When, however, the ratchet-wheel 69 is rotated, the shaft 70 is caused by the key to rotate with it. This shaft passes through and is supported by a bearing on the outer extremity of the tool-support 43. The portion of the shaft 70 farthest removed from the bearing 43 has a screw-thread cut upon it, said thread engaging a female thread cut in a hole traversing the tool-support 44. The shaft 70 is provided at about the middle of its length with a large collar, which may be either rigidly fastened to or made part of the shaft, as preferred. A powerful spring 71 is placed under compression between the bearing on the end of the tool-support 43 and the large collar on the shaft 70, thus exerting throughout the period of action of the feed-motion a powerful pressure upon shaft 70, which is transmitted from that shaft to tool-support 44.

The operation of the feed mechanism above described is as follows: The shaft 51, which is driven either by a prime mover, a counter-shaft, or, preferably, by the gearing which drives the lathe-spindle, transmits its motion by means of the bevel-gears 52, 53, 54, 55, 56, 57, 58, and 59, which are mounted upon suitable shafts and supported in suitable bearings, as before described, to the shaft 60. The crank-disk 61, fixed on the end of shaft 60, can be kept in motion throughout the time that the lathe is in operation, or be stopped at the will of the operator by stopping or starting the shaft 51, and by means of the connecting-rod 62 and crank 61 the bell-crank 63 can be kept oscillating throughout the time of action of the lathe, the degree of the angle of oscillation being dependent upon the adjustment of the crank-pin in the slot of the crank-disk 61. The rocker-arm 67 being continuously in motion, the pawl 68 is made to engage the teeth on the circumference of the ratchet-wheel 69, and at every oscillation of the rocker-arm 67 the ratchet-wheel 69 rotates through a certain portion of a revolution, thereby causing coincident rotation of the shaft 70. The screw on the other end of the shaft 70 gradually disengages itself from the female screw in the tool-support 44, thereby causing the collar on the shaft 70 to approach the bearing on the outer end of the tool-support 43 and compressing the spring 71 between this collar and the bearing. If the tool-support 44 were not restrained from moving toward the work 46 by means of the screw 76, which draws upon the stud 79, attached to the tool-holder 45, the constant pressure of the spring 71 upon the tool-support 44 would cause it to move rapidly forward in the direction of the work. The spring 71 can be tightened so as to produce any desired degree of pressure upon tool-support 44, and when tightened to the desired extent the pawl 68 is thrown out of gear with the ratchet-wheel 69, thus rendering the tool-support 44 subject to a constant and uniform pressure from the spring 71, which pressure tends to advance the tool-support toward the work. The rate of advance of the tool-support is, however, in no wise affected by the shaft 70, the spring 71, or the mechanism used for tightening the same.

The rate at which the tool-support 44 is fed or advanced is governed by the following mechanism: Throughout the period that the spring 71 is under tension the pressure of the spring upon the tool-support 44 is opposed partly by the resistance of the work to the advance of the tool and partly by the screw 76, which is attached to the top of the tool-holder 45. Up to the time that the tool begins to cut the work the whole pressure of the spring 71 is resisted by the screw 76, and when the tool begins to cut the greater the resistance offered to the tool by the work the less will be the strain sustained by the screw 76. The screw 76 and the tool-holder 45, which is attached thereto, are allowed to advance toward the work by unscrewing the internal thread of the worm-wheel 75, which engages the screw 76, and the rate at which the tool-holder 45 and screw 76 advances will depend upon the rate at which the worm-wheel 75 is rotated. The worm-wheel 75 may be made to rotate by turning the shaft 93, upon which the worm 94 is mounted, so as to engage the worm-wheel 75. The shaft 93 may be rotated either by turning the hand-wheel 96, attached thereto, or by the ratchet-wheel 65, which is moved, as hereinbefore explained, by the rocker-arm 63 and pawl 64. The rate of advance of the tool-support 44 and the tool-holder 45, mounted thereon, is then dependent upon the rate at which either the hand-wheel 96 or the ratchet-wheel 65 is, respectively, rotated.

The bell-crank 63, pawl 64, ratchet-wheel 65, shaft 93, worm 94, worm-wheel 75, and screw 76 form a train of mechanism for regulating the rate at which the tool-support 44 and the part mounted thereon advance toward the work. This mechanism illustrates one form of rate-governing mechanism which, in operation, exemplifies the characteristic features of such mechanism, as hereinbefore specified.

The rocker-arm 67, pawl 68, ratchet-wheel 69, shaft 70, and spring 71 together constitute a train of mechanism for effecting the advance of the tool-support 44 toward the work, and this train serves as one example of the mechanism which has been hereinbefore referred to as an "advancing" mechanism.

The above-described trains of advancing and rate-governing mechanisms are used for feeding the tool-support 44 and the tool-holder 45, mounted thereon; and since both of these trains of mechanism subject the tool-support and tool-holder to powerful strain throughout the period of their action they take up the lost motion in the joints between the tool-support 44 and the tool-support 43, as well as between the tool-holder 45 and the tool-support 44, and at the same time cause both the tool-holder 45 and the tool-support 44 to deflect even before the tool comes in contact with the work as much as or more than they would deflect under the pressure of the work against the tool, thus preventing the chatter and vibration incident to tool-supports and tool-holders as heretofore constructed.

Figure 8:
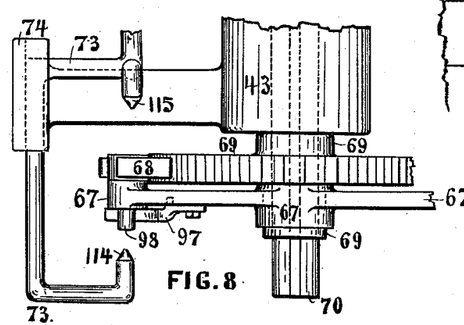
Fig. 8, a plan or top view of the same.

The tool-support 43 is fed backward and forward upon the guides, around which it fits on the casting 42, by means of two trains of mechanism—one for causing the advance of the tool-support and the other for regulating the rate at which this advance takes place—the parts of said mechanism being substantially identical in form and in function with those of the two trains of mechanism which are used for feeding tool-support 44. The operation of the feed mechanisms of the tool-support 43 is as follows: On the end of the shaft to which the bevel-gear 57 is attached farthest from said gear is fixed a crank-disk 99, similar to the crank-disk 61, before described. The connecting-rod 100 connects the adjustable disk 99 with the end of the bell-crank 101. This bell-crank is oscillated, by means of the connecting-rod 100, around a shaft 111, and carries on one end a pawl 102, which engages the teeth on the circumference of a ratchet-wheel 103, which is mounted upon the shaft 111. A hand-wheel 104 is also secured upon the end of this shaft, on the other end of which is fixed a worm which engages and drives a worm-wheel 87 in a manner similar to that in which the worm 94 drives worm-wheel 75. The inside of the worm-wheel 87 has cut upon it a screw-thread to engage the thread of the screw 86. The bell-crank 101 is provided with a third arm 112, the end of which arm is coupled by a connecting-rod 108 to a rocker-arm 105. The rocker-arm 105 is mounted, in a manner similar to the rocker-arm 67, upon the hub of a ratchet-wheel 107, and is caused to oscillate freely about this hub by means of the connecting-rod which couples it with the bell-crank 101. On the other end of the rocker-arm 105 is journaled a pawl 106, which can be thrown into gear with the ratchet-wheel 107, thus causing the latter to rotate through a greater or less angle, according to the angle of oscillation of the rocker-arm. The ratchet-wheel 107 is bored out to fit around the shaft 109, and is provided with a key which engages a keyway cut in the shaft 109, so as to effect the coincident rotation of the shaft and the ratchet-wheel, and at the same time to admit of free backward and forward movement of the shaft through the ratchet-wheel. The other end of the shaft 109 has a screw cut upon it which engages a female thread cut in a hole bored in the tool-support 43. A spring 110 bears at its ends against a collar fixed on the shaft 109, near the middle thereof, and against a bearing 113, which is attached to or forms part of the casting 42. The spring 110 is tightened by means of the rocker-arm 105, pawl 106, ratchet-wheel 107, and shaft 109 to any desired degree of tension, and transmits its pressure through the shaft 109 to the tool-support 43 in a manner similar to that in which the spring 71 is tightened, and transmits its pressure to the tool-support 44 by means of the rocker-arm 67, pawl 68, ratchet-wheel 69, and shaft 70. A clevis-casting 81 fits around the stud-bolt 79, which is attached to the tool-holder 45, (the link 78 fitting between the upper and lower forks of the clevis 81,) so that the tool-holder 45 can be pivoted about on the tool-support 44 without altering the position of the clevis-casting 81. The end of the clevis-casting farthest from the tool-holder 45 is planed to fit around guides upon the casting 82. As the tool-support 44 is moved backward and forward upon the tool-support 43, the two arms 116 and 117, which project from the tool-support 44, cause the clevis-casting 81 to move backward and forward with the tool-support 44, the planed portion of the clevis 81 sliding backward and forward and being guided by the planed portion of the casting 82. A boss 84, which is either fixed to or formed as a part of the casting 82, is coupled by means of a pin 85 to the clevis on the end of the screw 86, so that when the tool-support 43 is subjected to pressure from the spring 110, either the whole or a part of this pressure is transmitted through the tool-support 44, tool-holder 45, clevis-casting 81, and guide-casting 82 to the screw 86. The guide-casting 82 is connected by a pivot 83 to the brace 90, in order to allow for lost motion in the fitting of the clevis 81 to the guide 82, and also to allow for a slight wear between the surfaces of these parts. It is, however, not absolutely necessary that the guide 82 should be pivoted to the brace 90, as it might, if preferred, be cast rigidly upon it, since the brace 90 accompanies the tool-support 43 as it slides lengthwise of the shears 40 backward and forward while being fed. The rate at which the tool-support 43 is fed backward and forward is regulated by the motion of the bell-crank 101, pawl 102, ratchet-wheel 103, shaft 111, worm-wheel 87, and the worm mounted on shaft 111, which drives this wheel and screw 86 in a manner similar to that in which the rate of advance of the tool-support 44 is regulated by the bell-crank 63, pawl 64, shaft 93, worm 94, worm-wheel 75, and screw 76. It is desirable that each of the springs 71 and 110 should exert a uniform pressure, respectively, through their pressure-transmitters 70 and 109, upon the tool-supports which the springs are intended to feed throughout the time of their action. Having tightened either of these springs—as, for example, the spring 71—to the desired degree of tension, it can be kept under a uniform tension by having the rocker-arm 67, ratchet-wheel 69, and the pitch of the thread on the screw 70 so proportioned with relation to the arm of the bell-crank 63, to which the pawl 64 is attached, and the ratchet-wheel 65, worm 94, worm-wheel 75, and the pitch of the thread on the screw 76, that a single oscillation of the bell-crank 63 will cause the shaft 70 to be screwed out of the tool-support 44 to exactly the same distance that the screw 76 is allowed to advance through the same stroke of the bell-crank 63. I have, however, shown a mechanism for automatically maintaining each of these springs under any desired tension, the same being illustrated on a small scale in Figs. 4, 5, and 6, and on a larger scale in Figs. 7 and 8. A rod 73 is connected to shaft 70 between the small collar 72 on this shaft and the large collar which takes the thrust of the spring 71, the connection of the rod with the shaft being such as to permit it to partake of the longitudinal movements of the latter without rotating therewith. The rod 73 is bent in several directions and is guided in its motion by passing through a slotted guide 74, which supports it close to the pawl 68. The two points 114 and 115 are attached to bent rod 73 and are so placed that one of them 115 can be made to strike against the upper prong on the pawl 68, while the other 114 can be made to strike against the lower projection on the pawl 68. The method of operating this mechanism for maintaining the spring at the proper tension is as follows: Assuming that the pawl 68 is adjusted in the position in which it is seen in Figs. 7 and 8—namely, so that it is entirely disengaged from the ratchet-wheel 69—it is held in this position by means of the spring 97, which presses against a small flat surface formed upon the pin 98, which is attached to and projects from the body of the pawl 68. When the pawl is in this position, the rocker-arm 67 may oscillate any number of times without affecting the ratchet-wheel 69. Now suppose the pawl 64 to be engaged with the ratchet-wheel 65, the oscillation of the bell-crank 63 will allow the screw 76 to advance toward the work. The screw 70, being pushed by the spring 71, will of course advance to the extent that is allowed by the screw 76. The bent rod 73 is, however, carried forward with the shaft 70 until the projection 114 is brought across the path in which the pawl 68 is oscillated. When the projection 114 has come far enough across this path, the projecting prong on the pawl, as it oscillates downward, comes in contact with the projection 114, which causes the pawl to pivot about its bearing on the rocker-arm 67 until it engages the ratchet-wheel 69. When it has reached this position, it is maintained in contact with the ratchet-wheel by the spring 97, which then presses upon the other small flat surface formed upon the projecting pin 98. Every oscillation of the rocker-arm 67 then causes the shaft 70 to be unscrewed from the tool-support 44, thus gradually tightening up the spring 71 by causing the shaft 70 to move out away from the tool-support 44. As this shaft moves out, it causes the upper projection 115 on the rod 73 to approach the path along which the pawl 68 is oscillating. When the projection 115 crosses this path of oscillation, it disengages the pawl from the ratchet-wheel, again bringing it back to the position in which it is seen in Figs. 7 and 8. By properly adjusting the position of the projections 114 and 115 with relation to one another and to the pawl 68 they may be made, by throwing the pawl in and out of gear with the ratchet-wheel, as explained, to maintain the spring 71 approximately at any desired degree of tension.

Figure 9:
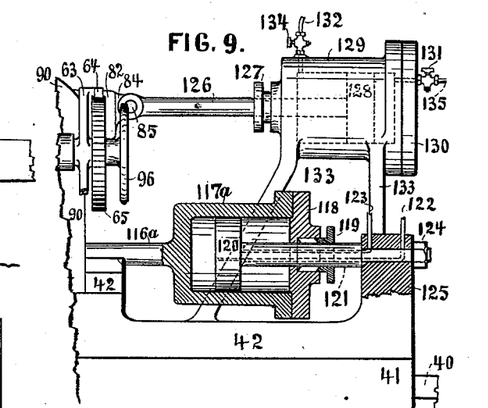
Fig. 9, a view, partly in elevation and partly in section, illustrating a modification of the feed mechanism.

Fig. 9 illustrates a modification of the feed mechanism above described as applied and similarly operating to feed the tool-support 43 in the lathe. (Shown in Figs. 4, 5, and 6.) Only such of the parts illustrated in Fig. 6 as will suffice to clearly explain the operation of this modification are, however, shown in Fig. 9. A rod $116^a$ is secured to or forms part of the tool-support 43, which is not shown in Fig. 9, but which corresponds in form and location with the tool-support 43, (shown in the adjoining Fig. 6,) the rod $116^a$ being attached to the tool-support in the same position as the shaft 109. (Illustrated in Fig. 6.) A piston-rod 126 is also attached by a pin 85 and boss 84 to the casting 82, these parts being the same as those illustrated in Fig. 6. A cylinder $117^a$, bored to receive a hydraulic piston 120, is formed integral with or secured to the end of the rod $116^a$, the rod 121 of the piston 120 passing through the cylinder-cover 118, which is bolted to the end of the cylinder $117^a$, and being packed by the gland 119. The end of the rod 121 farthest from the cylinder is rigidly bolted to a bearing 125 by a nut 124, the bearing 125 being either a part of or rigidly attached to the casting 42. Water is conveyed to or from one side of the piston 120 within the cylinder $117^a$ by a pipe 122, communicating with a small longitudinal passage extending through the piston-rod and piston, and is conveyed to or from the other side of the piston 120 through a pipe 123, communicating with a passage extending through the piston and opening into the cylinder adjacent to the piston. A hydraulic cylinder 129 is fixed upon the top of a standard or bracket 133, which is rigidly attached to or forms part of the casting 42. The piston-rod 126, which is provided with a clevis at the end through which the pin 85 fits, enters the hydraulic cylinder 129 through the gland 127, by which it is packed, and within the cylinder this rod is secured to the piston 128. Water is admitted to and allowed to pass out from one end of this cylinder through a pipe 132, governed by a valve 134, and is admitted to and passes out from the other end of the cylinder through a pipe 135, governed by a valve 131, these valves being so constructed that when water is admitted to the cylinder they can either be closed, so as to entirely prevent its escape, or opened to any desired extent to allow the water to escape either very slowly or faster, at the will of the operator.

The method of operating the feed mechanism above described is as follows: Water under heavy pressure is admitted to the cylinder $117^a$, which pressure, being transmitted through the rod $116^a$ to the tool-support 43, tends constantly to move the tool-support 43 in the direction in which it is transmitted thereto. If the tool-support 43 were free to move, it would of course be advanced by this pressure until the piston 120 came in contact with one or the other end of the cylinder. The rate, however, at which the tool-support 43 is allowed to advance is regulated by the piston-rod 126, the end of which is connected, by means of the casting 82, clevis-casting 81, stud-bolt 79, tool-support 45, and tool-support 44, to the tool-support 43. The advance of the piston-rod 126 is either entirely prevented or regulated to any desired rate of speed, as the case may require, by the water which is inclosed within the cylinder between the piston 128 and one or the other end of the cylinder, this water being allowed to escape at any desired rate, or being entirely prevented from escaping, by the valves 134 and 135. I do not, however, consider this means of regulating the rate at which the tool-support advances to be as desirable as the more positive mechanism shown in Fig. 6, for the reason that the exact regulation of the rate of feed may be much more readily effected with the screw, worm, and worm-wheel, &c., illustrated in said figure. I consider, however, the advancing mechanism, consisting of the hydraulic cylinder $117^a$, piston 120, &c., (shown in Fig. 9,) to be preferable to either of the advancing mechanisms shown in Figs. 4, 5, and 6, being much simpler and more readily and rapidly adjusted.

The trains of advancing and rate-governing mechanisms, which have been hereinbefore described, for causing the tool-support 43 and the parts mounted thereon to feed backward and forward upon the support 42, and for governing the rate at which these parts are fed, maintain throughout the period of their action not only the tool-support 43, but also the tool-support 44 and the tool-holder 45, and all of the joints in the advancing and rate-governing mechanisms, under substantial strain, thus causing them to deflect to as great or a greater extent and in the same direction that the pressure of the work on the tool would cause them to deflect, and at the same time taking up the lost motion between the joints of these parts, thus preventing the chatter and vibration which would otherwise take place under the action of feeding mechanisms as heretofore used.

A special feature of advantage in the operation of these two feed mechanisms is that while one of them is being used for advancing one of the tool-supports the other can be made to maintain the tool-support which it is intended to feed, as well as the other tool-support and parts attached thereto, continually under strain without the necessity of causing the tool-support to advance, thus preventing chatter and vibration in the direction in which both feed mechanisms are adapted to take up the lost motion. Thus, for example, if the spring 71 and screws 76 are being employed and the tool-support 44 and tool-holder 45 caused to approach the central axis of the lathe, and it should not be desired that the tool-support 43 should move parallel to the axis of the lathe, a strain can be exerted through the combined pressure of the spring 110 and screw 86, not only upon the tool-support 43, but also upon the tool-support 44 and the tool-holder 45, causing them to deflect and take up the lost motion between their joints in a direction at right angles to that in which the spring 71 and screw 76 take up their lost motion and cause them to deflect.

It is frequently necessary, owing to the shape of the tool being used and the work which is being operated upon, to thus take up the lost motion and cause the tool-supports and parts attached to them to deflect in a direction divergent from that in which the tool is actually moving in taking the feed; and this I accomplish, as above explained, by a duplex arrangement of my improved feed mechanism, in which the effect of the conjoint use of two systems acting together with different relative degrees of energy is that the resultant deflection which they institute in the tool-holder and its supports shall either be exactly or approximate as closely as may be to that which would otherwise be the natural deflection of the tool-support in taking the feed. This being accomplished, one or the other of the pair thus co-operating alone acts to advance or retract the tool, its fellow meanwhile remaining as a passive assistant so far as further motion is concerned. This is a very important feature of my invention. If the angular pitch of the threads on the screws 76 and 86 are sufficiently steep, it will require but little effort to allow the tool-supports which they are intended to feed to advance, so that the hand-wheels 96 and 104 can be used for this purpose, even if the tool-supports are subject to a very severe strain from the springs 71 and 110.

Another important feature of my invention is the fact that the heavier the pressure of the work upon the tool the easier it becomes to operate the rate-governing mechanism, since a larger portion of the strain which is at other times transmitted to these mechanisms through the tool-supports is then received by the tool.

The method of feeding the supports of metal-cutting tools which is exemplified in the operation of the mechanism herein set forth is not claimed as of my present invention, the same constituting the subject-matter of Letters Patent of the United States, No. 387,121, granted and issued to me under date of July 31, 1888.

I claim as my invention and desire to secure by Letters Patent—

1. The combination, with the support of a metal-cutting tool, of a reciprocating ram, mechanism through which pressure acting on said ram is exerted upon the tool-support, tending in the direction in which said tool-support is to be advanced, and a holdback-screw and nut, and abutments through which resistance is exerted against the advancing movement of the tool-support, substantially as set forth.

2. The combination, with the support of a metal-cutting tool, of a reciprocating ram, mechanism through which pressure acting on said ram is exerted upon the tool-support, tending in the direction in which said tool-support is to be advanced, a holdback-screw and nut, and abutments through which resistance is exerted against the advancing movement of the tool-support, and suitable known mechanical connections whereby said screw or nut may be rotated one relatively to the other, substantially as set forth.

3. The combination, with the support of a metal-cutting tool, of a reciprocating ram, mechanism through which pressure acting on said ram is exerted upon the tool-support, tending in the direction in which said tool-support is to be advanced, a holdback mechanism consisting of a screw of rapid pitch, a corresponding nut, and abutments for said screw and nut, and suitable known mechanical connections whereby said nut may be caused to either permit or prevent motion in said holdback mechanism, substantially as set forth.

4. The combination, with the support of a metal-cutting tool, of two reciprocating rams, mechanism through which pressure acting on said rams is exerted upon said tool-support in divergent lines, and two holdback-screws connecting said tool-support with relatively-fixed abutments, these members being combined and co-operating to produce initial deflection and take up of lost motion in the resultant direction of their otherwise independent action, substantially as set forth.

FRED. W. TAYLOR.

Witnesses:
CHARLES H. WEISS,
JALEZ GATES.